F. R. LONG.
FORGING MACHINE FOR MAKING CIRCULAR CAPS AND ANALOGOUS METAL FORMS.
APPLICATION FILED JAN. 29 1916.

1,207,948.

Patented Dec. 12, 1916.
7 SHEETS—SHEET 1.

Fig. 1.

Inventor
FRED R. LONG.

F. R. LONG.
FORGING MACHINE FOR MAKING CIRCULAR CAPS AND ANALOGOUS METAL FORMS.
APPLICATION FILED JAN. 28, 1916.

1,207,948.

Patented Dec. 12, 1916.
7 SHEETS—SHEET 3.

Fig. 3.

Witness

Inventor
FRED R. LONG.
By
Attorney

F. R. LONG.
FORGING MACHINE FOR MAKING CIRCULAR CAPS AND ANALOGOUS METAL FORMS.
APPLICATION FILED JAN. 28, 1916.

1,207,948.

Patented Dec. 12, 1916.
7 SHEETS—SHEET 4.

Witness
Emory L. Groff.

Inventor
FRED R. LONG.
By
Attorney

UNITED STATES PATENT OFFICE.

FRED R. LONG, OF CATAWISSA, PENNSYLVANIA.

FORGING-MACHINE FOR MAKING CIRCULAR CAPS AND ANALOGOUS METAL FORMS.

1,207,948.

Specification of Letters Patent.

Patented Dec. 12, 1916.

Application filed January 28, 1916. Serial No. 74,900.

*To all whom it may concern:*

Be it known that I, FRED R. LONG, a citizen of the United States, residing at Catawissa, in the county of Columbia and State of Pennsylvania, have invented certain new and useful Improvements in Forging-Machines for Making Circular Caps and Analogous Metal Forms, of which the following is a specification.

This invention relates to forging machines for making circular caps and analogous metal forms, and has particular reference to a device that is of special utility in making caps for high explosive shells.

A primary object of the invention is to provide a machine of the character set forth that will form the complete shell caps or the like with the aid of a minimum number of mechanical instrumentalities, and in a minimum number of operations, thereby insuring a maximum rapidity of production, while at the same time maintaining a uniform high standard of accuracy and perfection in the ultimate product.

A further object of the invention is to provide a machine that has particularly in view the economical use of the metal stock employed in the forging operation. That is to say, the invention contemplates a machine capable of forming the required product so rapidly that the original heat of the stock piece is greatly conserved, thereby reducing much of the strain on the machine parts that would otherwise be imposed if the metal cooled too much due to slow or improper handling of the metal by the machine. In this connection, the invention also proposes to prevent the usual waste of metal incident to making perforated bodies by eliminating the usual disk or button of metal common to the formation of a hole or opening in a metal body by an ordinary punching operation.

A further object, including the foregoing general objects is to provide a machine that is of strong and rigid construction, and simple and reliable in operation, thus combining the essential features of a machine of this character in a practical and advantageous manner, whereby its commercial value and efficiency is greatly enhanced.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings, in which—

Similar reference characters designate corresponding parts throughout the several figures of the drawings.

In carrying out the present invention, it is proposed to provide a novel construction and arrangement of mechanical parts, whereby a heated stock piece of suitable diameter may be fed by stock advancing apparatus into a die element where the desired circular cap or equivalent body is quickly formed, thereby conserving the heat of the bar, and at the same time utilizing all of the metal without waste.

Figure 8:
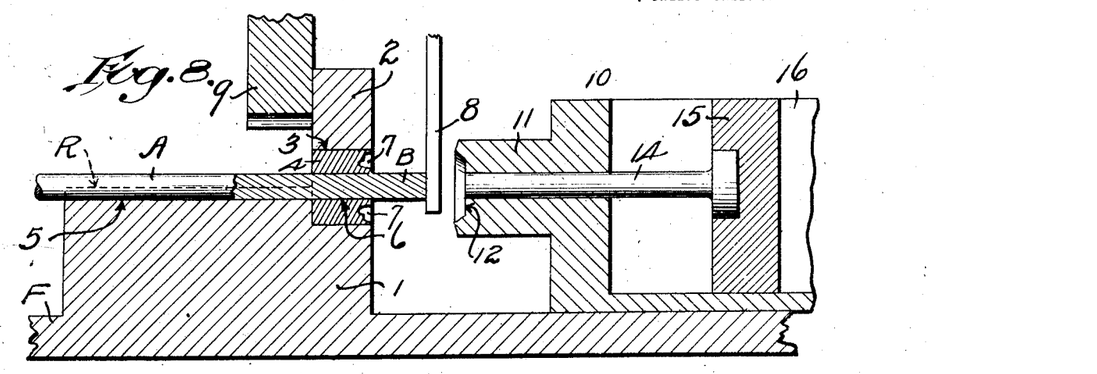
Fig. 8 is a diagrammatic view showing the relative position of the working parts of the machine when the stock piece has been fed a predetermined distance through the die.
Figure 9:
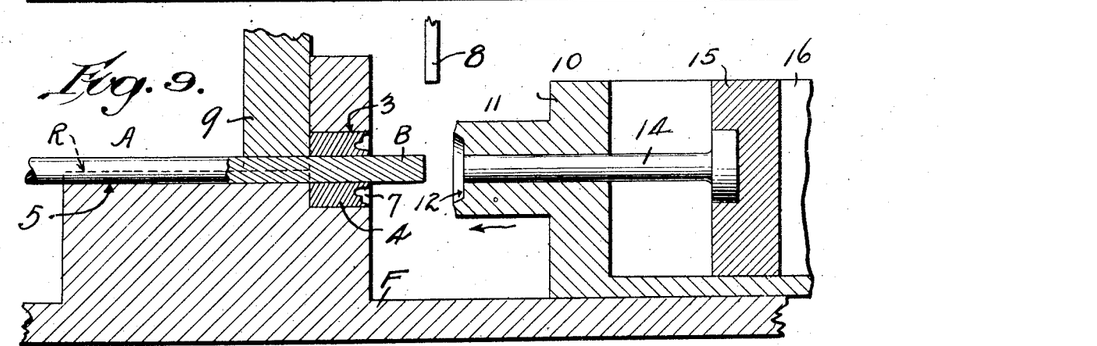
Fig. 9 illustrates the next step in the operation of the apparatus wherein the stock piece is clamped rigidly to the die holder block prior to the upsetting operation.

The stock piece above referred to is designated in the accompanying drawings by the reference A, and may be fed at required intervals onto the stock rest R of the framework F of the machine by any suitable feeding means not shown. This stock rest R is preferably the upper part or surface of a die holder block 1 which is rigid with the framework F of the machine, and is provided at one end with an upstanding guide wall 2. A die receiving opening 3 is formed at the junction of the wall 2 with the die block so that the die, though removable will have a rigid emplacement, to thereby withstand the severe strains and shocks incident to the forging operation. The said stock rest R is provided with a suitable groove 5 for receiving and guiding the stock piece in its movement toward the die, and this groove 5 is concentric with a stock feed opening 6 in the center of the die 4. Thus, it will be apparent that the stock piece may be readily moved across the stock rest to and through the die 4, so that the end portion thereof designated as B may project beyond the mouth of the opening 6 and the intaglio anvil face 7 of the die. For the purpose of limiting the forward movement of the stock piece through the die to insure the correct predetermined length of the body blank B, there is provided a vertically swinging stop arm 8, shown in Fig. 8, which constitutes a part of a stock measuring device designated generally as M. Accordingly, from the foregoing description, it will be apparent that the initial step of the operation of the machine is the advancing of the stock piece A to and through the die 4 until the end thereof abuts against the stop arm 8. This preliminary step is fully shown in Fig. 8, and does not involve the operation of any of the other mechanical instrumentalities. After the stock has been thus positioned and measured in the die 4, the stock arm 8 moves upwardly out of the way as shown in Fig. 9, and a clamping arm 9 of a clamping device C moves downwardly along the rear side of the guide wall 2 to firmly and rigidly clamp the stock piece in the groove 5 of the stock rest. After the clamping arm 9 firmly engages the stock piece at the rear or feeding-in side of the die, an upsetting device designated generally as 10 begins to advance toward the anvil face 7 of the die, as also indicated by the direction of the arrow in Fig. 9.

Figure 10:
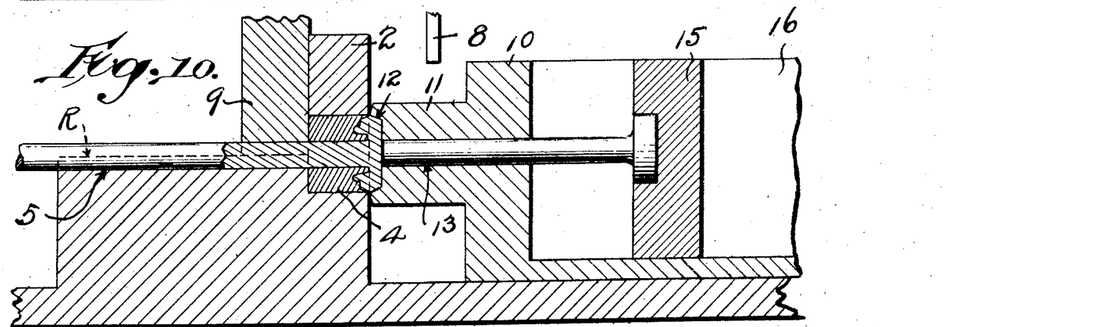
Fig. 10 shows the upsetting plunger advanced to full upsetting position.

The upsetting device 10 above referred to essentially comprises a plunger head 11 having a die recess 12 in the end thereof, and also having a central bore 13 which is designed to accommodate a reciprocatory shearing punch 14 rigidly carried by the end wall 15 of an operating yoke 16. As shown in Fig. 10, the third step in the operation of the device upsets the metal from the body blank B into the desired shape or form according to the character of the complemental die faces 7 and 12, thus flanging or heading the bar while the latter is rigidly clamped by the clamping arm 9 at the feeding-in side of the die.

After the circular cap or analogous metal body has been formed as shown in Fig. 10, the plunger head 11 of the upsetting device 10 remains in its full advanced position while the clamping arm 9 moves upwardly releasing its hold on the stock piece at the feeding-in side of the die. At this point, the shearing punch 14 advances in the direction of the arrow shown in Fig. 11, so that the working end thereof pierces the formed metal body B', thus providing a central opening, which in the case of shell caps is necessary to accommodate the fuse block. Thus, as will be apparent from Fig. 11, the forward movement of the punching shear 14 not only pierces the body of metal caged between the die faces 7 and 12 to form a fuse block opening, but at the same time, the forward extremity of the punch coöperates with the marginal edge of the mouth of the stock feed opening 6 to shear the body B' from the stock A.

Figure 11:
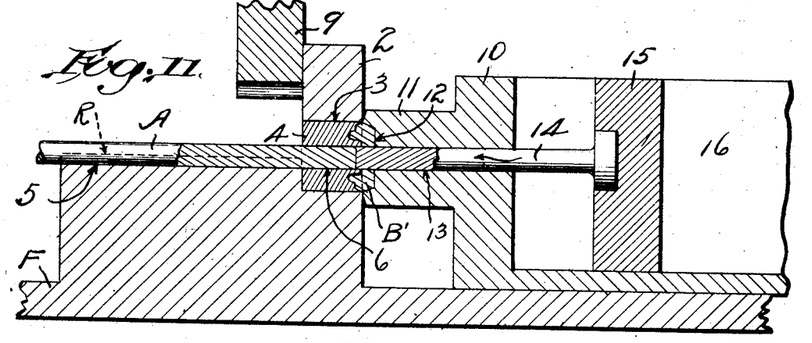
Fig. 11 illustrates the position of parts immediately after the upsetting operation, and wherein the clamping member releases the stock piece.
Figure 12:
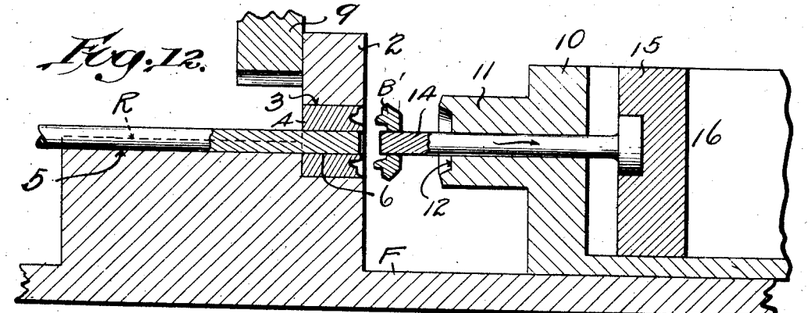
Fig. 12 is a diagrammatic view of the operation succeeding that shown in Fig. 11, and wherein the upsetting device has receded and the punching shear element has penetrated the circular member and severed the same from the stock piece.
Figure 13:
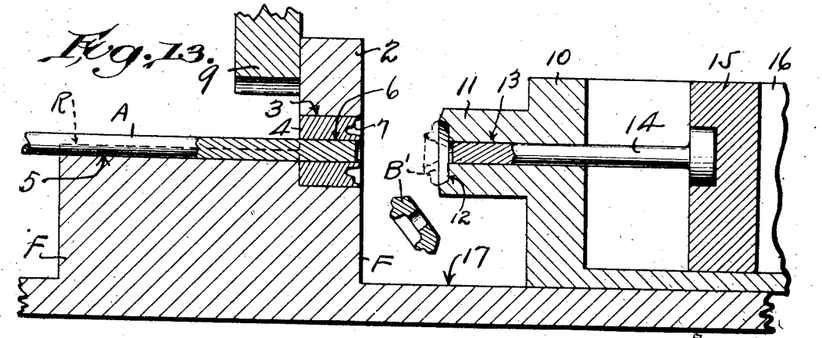
Fig. 13 is a diagrammatic view of the final operation wherein the punching shear element also recedes carrying with it the formed circular body to a certain point where the same is stripped from the punching shear.

While the shearing extremity of the punch 14 is in the position shown in Fig. 11, in which it has severed the formed body B' from the stock A, the upsetting device 10 recedes as shown in Fig. 12, thus releasing the cap B' from the die pressure, and leaving the same free to move away from the anvil face 7 of the die block 4. Therefore, when the shearing punch 14 recedes, it will be apparent that the formed body B' is carried away from the die 4 on the end of the punching shear as seen in Fig. 12, and when the latter recedes so that the end extremity thereof is entirely drawn in the bore 13 of the plunger head 11, the body B' will be stripped from the upsetting device as shown in Fig. 13. In this latter figure, the body blank is shown as being stripped or freed from the upsetting device in dotted lines, and is represented as being about to fall on the recovery floor 17 of the framework of the machine.

Figs. 8 to 13 inclusive of the drawings and the foregoing description are directed to the character and function of the active elements of the machine, which is the forging unit thereof, or the unit in which the metal is held while being worked upon by the machine. The mechanical elements referred to may be operated by various mechanical devices, but a preferred and practical type of apparatus involving novel movements and arrangements of parts is shown in Figs. 1 to 7 inclusive of the drawings.

Figure 1:
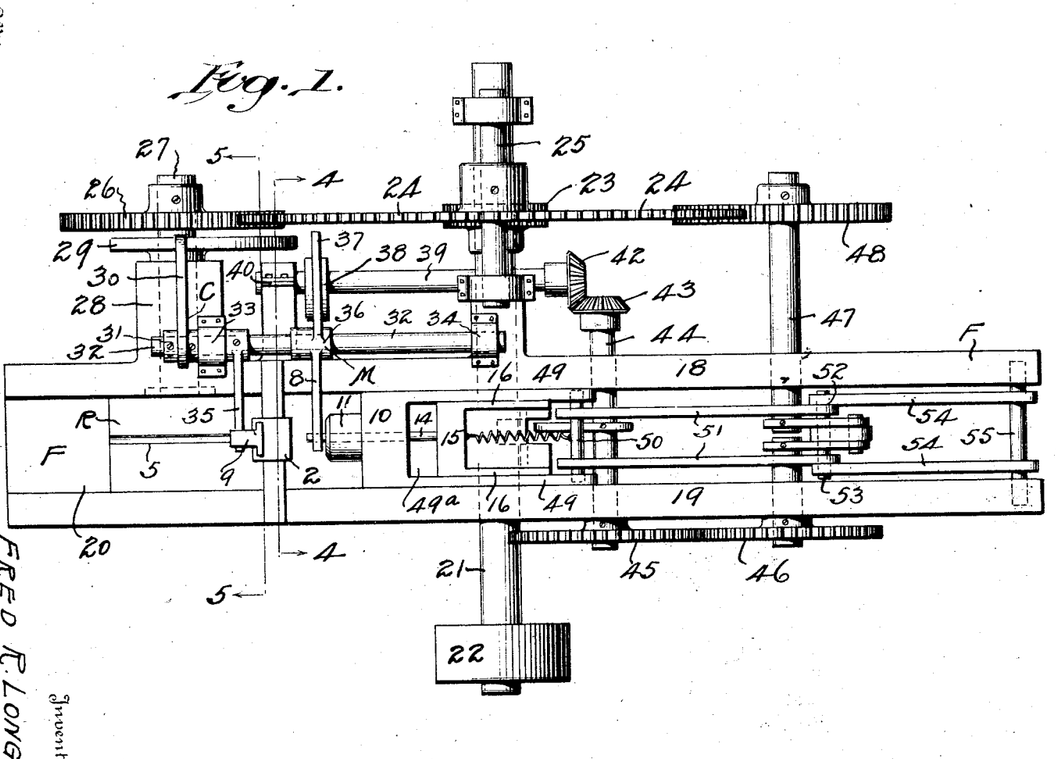
Figure 1 is a top plan view of the machine.
Figure 2:
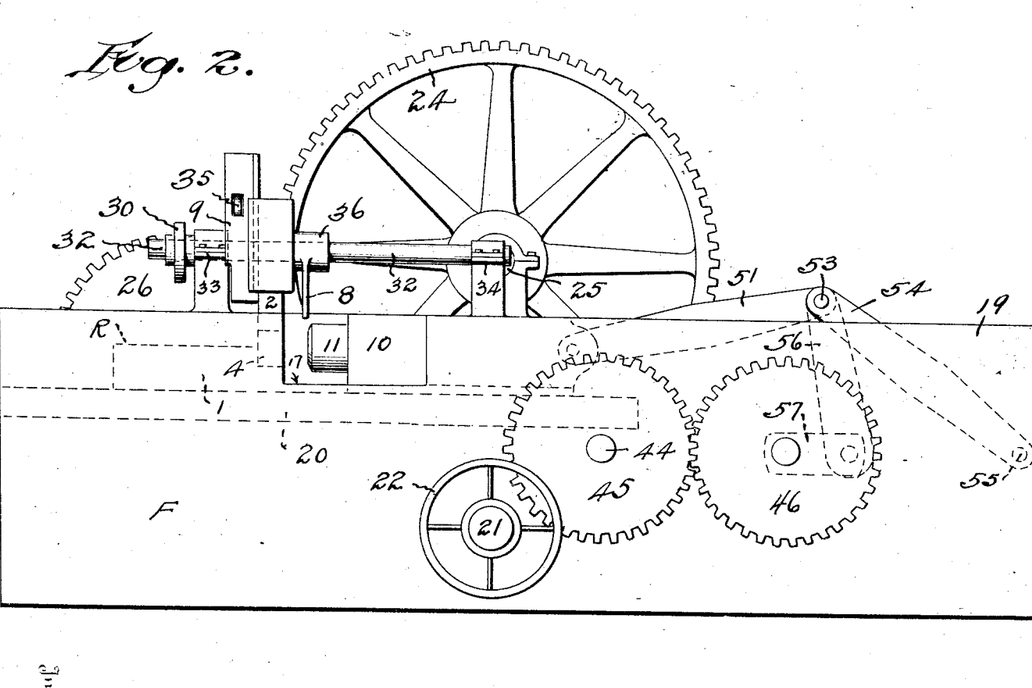
Fig. 2 is a front elevation thereof.
Figure 3:
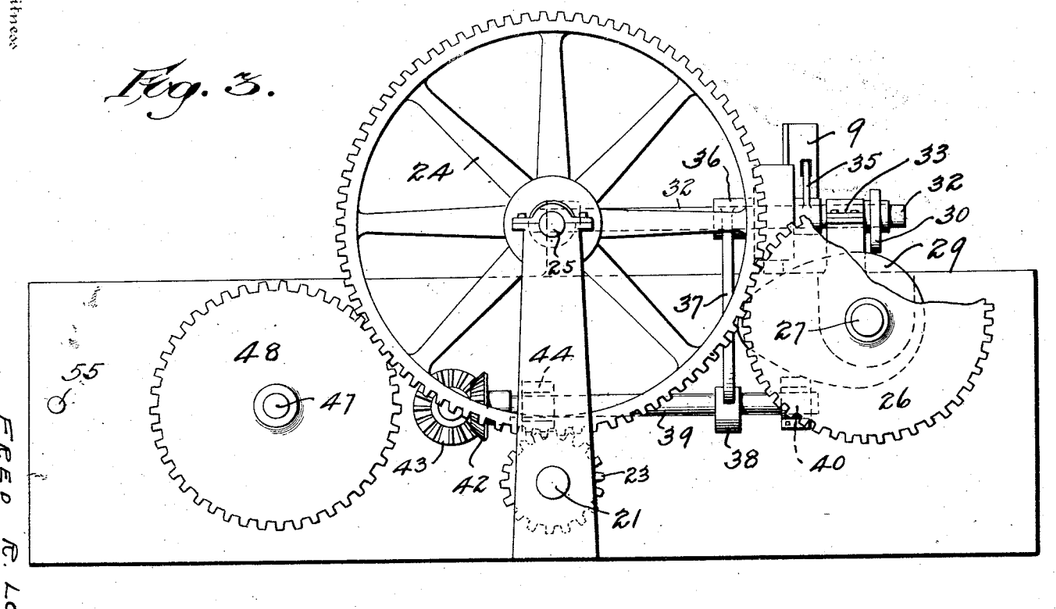
Fig. 3 is a rear elevation thereof.
Figure 4:
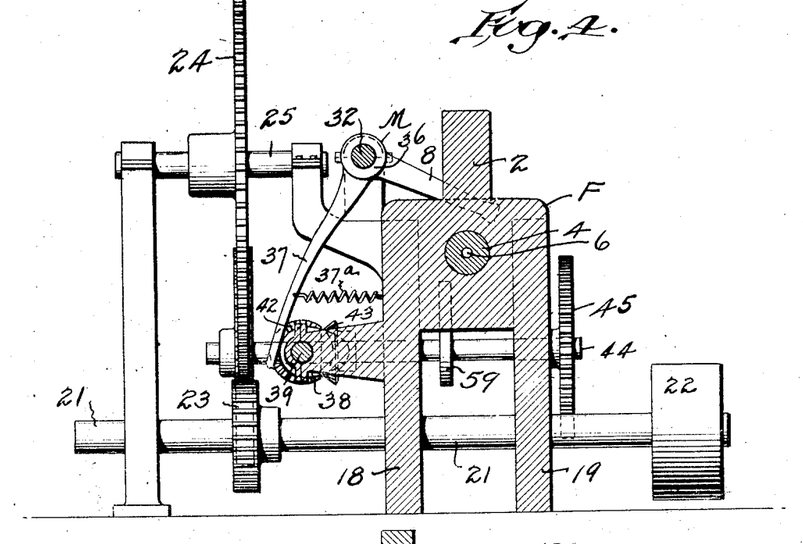
Fig. 4 is a cross sectional view on the line 4—4 of Fig. 1 looking in the direction of the arrows.
Figure 5:
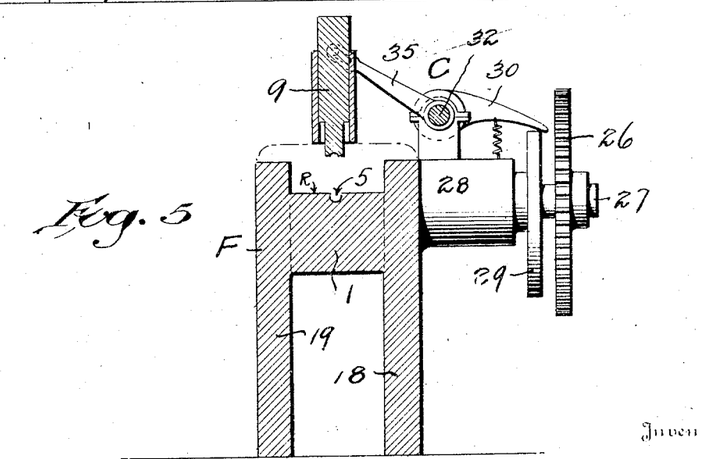
Fig. 5 is a cross section on the line 5—5 of Fig. 1 looking in the direction of the arrows.
Figure 6:
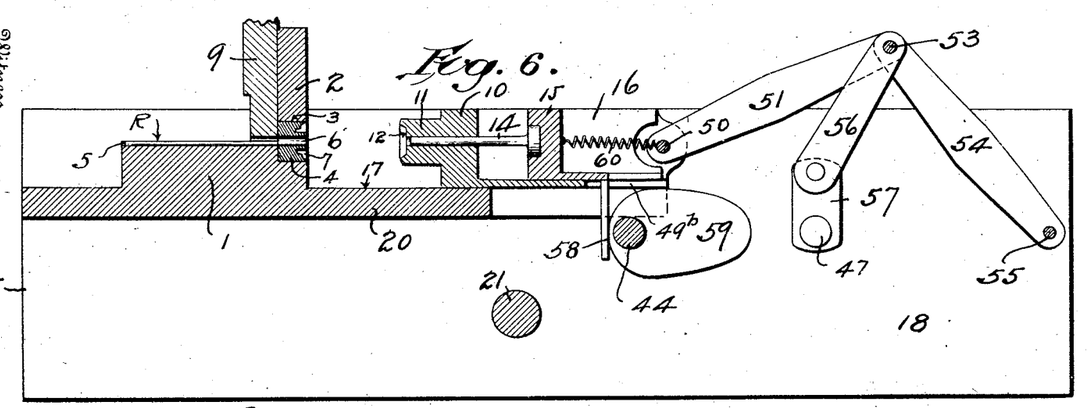
Fig. 6 is a vertical longitudinal sectional view of the machine parts prior to the initial advancing movement of the upsetting device.
Figure 7:
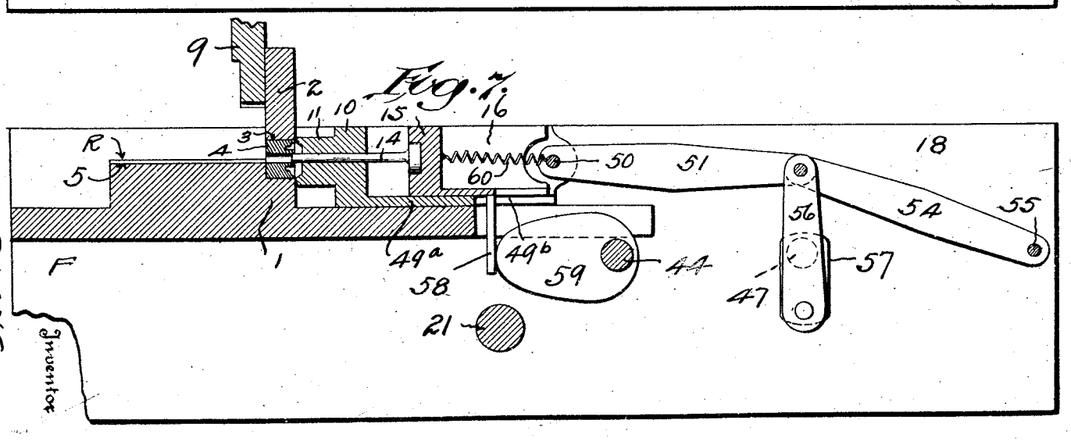
Fig. 7 is a view similar to Fig. 6 showing the relation of the parts at the end of the upsetting stroke.

As will be observed from Fig. 1, the present apparatus includes a substantial framework F which is so constructed that it is capable of withstanding the unusually heavy shocks and strains incident to the forging operation, and which preferably includes in its organization the opposite vertical side wall members 18 and 19 joined by a flat connecting wall 20, having rigid therewith the die holder block 1 as will be best observed from Figs. 6 and 7, and having its upper face on the forming side of the die constituting the recovery floor 17 previously referred to. Journaled in the lower part of the walls 17 and 18 at a substantially intermediate point is a main driving shaft 21 having at the front side of the machine a driving pulley 22, and at the opposite end on the rear side of the machine a driving gear 23 which meshes with a relatively large transmission gear 24 mounted on an elevated countershaft 25. This gear 24 meshes in turn with a clamping device operating gear 26 rigidly carried by a shaft 27 loosely journaled in an off-set bearing 28 at the forging unit end of the machine. The said shaft 27 in addition to having the gear 26 rigid therewith, also rigidly carries a suitable cam 29, the working periphery of which is adapted to engage with the spring tensioned end of a clamp operating lever 30 of the clamping device C and which is rigidly carried as indicated at 31, by an operating shaft 32 journaled as at 33 and 34 longitudinally of the machine. On the side of the journal 33 opposite the connection of the lever arm 30 with the shaft 32, the latter has also rigidly connected therewith a clamp engaging lever arm 35, the free end of which loosely engages with the upper portion of the vertically slidable clamping arm 9 working at one side of the die 4. At this point, it may also be noted that the vertically swinging stop arm 8 which operates in the preliminary action of the machine to form the correct length of the blank for the forging operation is rigidly carried by a sleeve 36 loosely mounted on the shaft 32. This sleeve also has integral therewith and extending in a direction opposite to the arm 8, a cam engaging arm 37 that is held by the spring 37$^a$ in contact with the peripheral edge of a cam 38 mounted on shaft 39 journaled as at 40 and 41 to the rear side of the machine. The shaft 39 has at one end a beveled gear 42 meshing with a bevel gear 43 carried by the shearing punch operating cam shaft 44, which latter receives its power through the gear 45 mounted on the end of said shaft that extends to the front side of the machine, and which meshes with a gear 46 carried by a crank shaft 47. This crank shaft has a gear 48 which directly meshes with the relatively large transmission gear 24, thus furnishing power for operating the vertically movable arm 8.

Referring further to the structural arrangement and mechanical movements whereby the upsetting and punching shear operations are carried out, it may be observed that the upsetting device 10 carrying the plunger head 11 is preferably provided with a base plate 49$^a$ and the rearwardly extending yoke arms 49 which are slidably guided between the walls 18 and 19 of the framework of the machine, and have at their rear ends a transverse bar 50. On this bar 50 is pivotally mounted one end of each of the paired toggle arms 51—51 which are joined as at 52 to a cross pivot 53, which also has connected therewith the paired toggle arms 54—54, the other ends of which swing on the fixed pivot bar 55 extending transversely of the walls 18 and 19 at one extreme end of the machine. The cross pivot 53 which forms an intermediate connection for the entire toggle member comprising the arms 51—51 and 54—54 is also pivotally connected with a link 56 which connects with the crank arms 57 rigidly carried by the crank shaft 47. Thus, it will be apparent that when the toggle arms are in the position shown in Fig. 6, the upsetting device will be in its normal position, but when they are extended as shown in Fig. 7, the plunger head 11 of the device 10 will be over against the anvil face of the die 4.

In connection with the punching shear 14 which operates as a final movement in the cycle of operation of the apparatus to form the opening in the circular body and sever it from the stock piece, it will be observed that the same is carried by the end wall 15 of the operating yoke 16 and has a free sliding movement in the bore 13 which extends entirely through the plunger head 11 of the upsetting device. Thus, the punching shear is movable axially through the plunger head toward the anvil face of the die 4 and back through the mouth of the stock feed opening 6 thereof. The operating yoke 16 carrying the shearing punch 14' is slidably mounted within the confines of the rear end of the upsetting device 10 which includes the yoke arms 49 and base plate 49$^a$, the latter having a suitable clearance slot 49$^b$ to accommodate the pendent cam abutment member 58. This cam abutment is adapted to be held in contact with the working periphery of a cam 59 carried on the shaft 44 by means of a spring 60 which connects with one side of the wall 15 of the operating yoke 16 and also with the cross pin 50 to which the arms 51—51 are pivoted. Thus, this arrangement provides for the shearing punch 14 being positively actuated in its forward punching and shearing movement, while its rearward movement is facilitated by the spring 60.

From the foregoing, it will be apparent that the stock piece A may be fed into the forging unit by any suitable means, so that a pre-determined length thereof projects beyond the anvil face of the die, and then the clamping arm 9 of the clamping device of the machine comes into play to grip the metal stock at the feeding-in side of the die so as to rigidly and firmly hold the stock clamped to the stock-rest which is a rigid part of the framework F of the machine, during the upsetting or heading operation. After the head has been formed on the bar, it will be clear that the occasion for the clamping arm being in holding position no longer exists, and the same may move back to its normal position, so that when the shearing punch comes into play, it will be possible for the same to fully punch or perforate the disk or equivalent body and at the same time sever the same from the stock piece by pushing the latter backward through the stock feed opening of the die.

Without further description, it is thought that the many features and advantages of the present invention will be readily apparent to those familiar with the art, and it will also be understood that various changes in the form, proportion and minor details of construction may be resorted to without departing from the spirit of the invention or scope of the appended claims.

I claim:

1. A forging machine for making circular caps and analogous metal forms including a die having a stock feed opening, a clamping device operating at one side of the die, an upsetting device working in opposition to the face of the die, and punching shear means coöperating with said upsetting device.

2. A forging machine for making circular caps and analogous metal forms including an upstanding guide wall having a die receiving opening therein, a die fitting said opening, a clamping device operating at one side of the said wall, an upsetting plunger operating at the opposite side of said wall in opposition to the die, and a punching-shear movable axially through the plunger and also into the die.

3. A forging machine for making circular caps and analogous metal forms including an upright guide wall having a die opening therein, a die fitted in said opening, a reciprocating clamp operating at one side of the guide wall, a shiftable gage operating beyond the opposite side of the guide wall, an upsetting plunger working in opposition to the face of the die, and a punching-shear movable axially through the plunger and also adapted to extend beyond the plunger and into the opening through the die.

4. A forging machine for making circular caps and analogous metal forms including a rigid framework having a die provided with a stock feed opening mounted therein, a stock measuring device operating at one side of the die, a clamping device operating at the feeding-in side of the die, an upsetting device working in opposition to the face of the die, a punching shear movable axially through the upsetting device, a main drive shaft journaled in the machine, means connected with said main drive shaft for operating said clamping means, means connected with said main drive shaft for operating said upsetting device and punching shear successively, and means connected with said means for operating the upsetting device and punching shear for operating the stock measuring device prior to the clamping device.

5. A forging machine for making circular caps and analogous metal forms including a rigid framework having a die provided with a stock feed opening, a stock measuring device operating at one side of the die, a clamping device operating at the feeding-in side of the die, an upsetting device working in opposition to the face of the die, a punching shear movable axially through the upsetting device, a main drive shaft journaled in the lower intermediate portion of the machine and having a driving gear, a relatively large transmission gear mounted above said driving gear and meshing therewith, a clamping device operating gear meshing with said transmission gear, means operated by said latter gear for actuating the clamping device, and means geared with the opposite side of the transmission gear for operating the stock measuring device, upsetting device and shearing punch in synchronism with the clamping device.

6. A forging machine for making circular caps and analogous metal forms including a rigid framework having a die provided with a stock feed opening, a stock measuring device operating at one side of the die, a clamping device operating at the feeding-in side of the die, an upsetting device working in opposition to the face of the die, a punching shear movable axially through the upsetting device, a main drive shaft journaled in the lower intermediate portion of the machine and having a driving gear, a relatively large transmission gear mounted above said driving gear and meshing therewith, means geared with one side of the gear for operating the clamping device, and means geared with the opposite side of the transmission gear for operating the stock measuring device, upsetting device and shearing punch in synchronism with the clamping device, including a crank shaft having a gear at one end meshing with said transmission gear, a toggle device operated by said crank shaft for actuating the upsetting device, a cam shaft geared with said crank shaft and having a cam for operating said shearing punch, and means geared with said cam shaft for operating said stock measuring device prior to the clamping device.

7. A forging machine for making circular caps and analogous metal forms including a rigid framework having a die provided with a stock feed opening, a stock measuring device operating at one side of the die, a clamping device operating at the feeding-in side of the die, an upsetting device working in opposition to the face of the die, a punching shear movable axially through the upsetting device, a main drive shaft journaled in the lower intermediate portion of the machine and having a driving gear, a relatively large transmission gear mounted above said driving gear and meshing therewith, a clamping device operating gear meshing with said transmission gear, cam and lever means operated by said latter gear for actuating the clamping device, means geared with the opposite side of the transmission gear for operating the stock measuring device, upsetting device and shearing punch in synchronism with the clamping device and including a crank shaft arranged parallel to said main drive shaft and having a gear at one end meshing with said transmission gear, a toggle device operated by said crank shaft for actuating the upsetting device, a cam shaft parallel with said crank shaft and geared therewith, and also having a cam for operating said shearing punch, a cam shaft journaled longitudinally of the machine and geared with said first mentioned cam shaft, and means controlled by said cam shaft for operating said stock measuring device prior to the clamping device.

In testimony whereof I hereunto affix my signature in the presence of two witnesses.

FRED R. LONG.

Witnesses:
J. N. WASTINE,
F. MAX LONG.